(12) United States Patent
Schmid et al.

(10) Patent No.: US 8,304,689 B2
(45) Date of Patent: Nov. 6, 2012

(54) DEVICE AND METHOD FOR LASER TREATMENT

(75) Inventors: Christian Schmid, Seelze (DE); Colin Birtles, Anaheim, CA (US)

(73) Assignees: Scientific & Efficient Technologies Ltd., Seelze (DE); Coast Composites, Inc., Irvine, CA (US)

( * ) Notice: Subject to any disclaimer, the term of this patent is extended or adjusted under 35 U.S.C. 154(b) by 979 days.

(21) Appl. No.: 12/273,662

(22) Filed: Nov. 19, 2008

(65) Prior Publication Data

US 2009/0152248 A1 Jun. 18, 2009

(30) Foreign Application Priority Data

Nov. 19, 2007 (DE) .......................... 10 2007 055 453

(51) Int. Cl.
*B23K 26/00* (2006.01)

(52) U.S. Cl. .......... 219/121.64; 219/121.63; 219/121.78
(58) Field of Classification Search ............ 219/121.64, 219/121.63, 121.78, 121.82, 121.83, 121.85; 156/272.8, 272.2, 60, 379.6, 349
See application file for complete search history.

(56) References Cited

U.S. PATENT DOCUMENTS

| | | | |
|---|---|---|---|
| 3,886,027 A * | 5/1975 | Hoffmann | 156/380.5 |
| 5,534,705 A * | 7/1996 | Terawaki et al. | 250/559.29 |
| 2001/0008228 A1* | 7/2001 | Meier et al. | 219/59.1 |
| 2001/0032832 A1* | 10/2001 | Chamberlain et al. | 219/121.83 |
| 2006/0196856 A1* | 9/2006 | Onose et al. | 219/121.63 |
| 2009/0107961 A1* | 4/2009 | Zaffino et al. | 219/76.14 |

* cited by examiner

*Primary Examiner* — M. Alexandra Elve
(74) *Attorney, Agent, or Firm* — Leydig, Voit & Mayer, Ltd.

(57) ABSTRACT

A device for laser welding of a workpiece includes a laser treatment head, a receiver carrying the laser treatment head and displaceable along a linear treatment zone, and a support configured to be temporarily fixable to the workpiece.

21 Claims, 6 Drawing Sheets

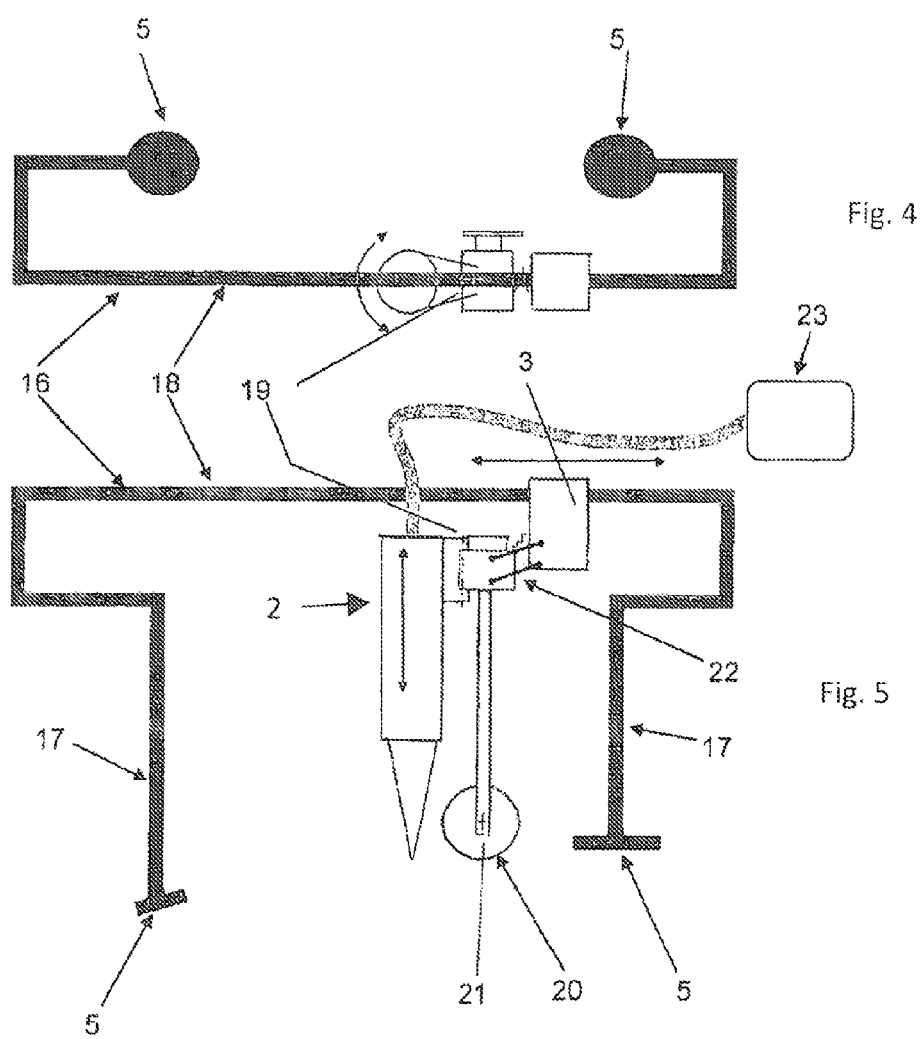

DEVICE AND METHOD FOR LASER TREATMENT

Priority is claimed to German Patent Application No. DE 10 2007 055 453.4, filed on Nov. 19, 2007, the entire disclosure of which is incorporated by reference herein.

The present invention relates to a device and a method for laser treatment, in particular for the laser welding of a workpiece, comprising a receiver which carries a laser treatment head and which is configured so as to be displaceable along a linear treatment zone.

BACKGROUND

A device of this type for the laser welding of a workpiece is used for example for the production of moulds for plastics material parts. For example, modern aeroplanes are increasingly manufactured from fiber-reinforced plastics materials. In this case, in comparison with other plastics material components, the components often have very large dimensions, in the range of up to 40 m in length.

However, in comparison with similarly large plastics material components from the field of yacht construction or large containers, there are significantly higher quality requirements for the components. The high quality standards are reflected in the very complex configuration of the moulds which are used for the production of the components. These are subject to a number of constraints:

High form and dimensional stability
Long endurance under cyclical thermal stress in the autoclave
Thermal expansion suited to the plastics material
Low weight
Helium-tightness of the mould surface.

These main requirements are met by a suitable selection of material—in many cases steels with a high proportion of nickel are used—and by an optimized design. The substructure of the actual mould surface is produced from a three-dimensional lightweight sheet metal structure. The actual mould surface on which the fiber-reinforced plastics material component is constructed is then applied to this substructure. The size of the moulds presents the manufacturing companies with serious difficulties, because worldwide, only a few machines are capable of working on workpieces longer than 10 m in one clamp. The dimensions also result in a transport problem. The transport costs escalate as the size increases.

The possibility of segmenting the large moulds, in order to produce individual modules with maximum dimensions suited to the manufacturing capacity of average plants and then to join then by a joining operation at the location where the mould is to be used, has also already been considered. In this case, the joining operation has to meet two basic requirements. On the one hand, the joining operation requires low-heat joining in order to minimize distortions. On the other hand, the gas-tightness of the joined mould must be ensured.

SUMMARY OF THE INVENTION

An aspect of the present invention is to provide a possibility of substantially simplifying the treatment of workpieces of this type. In particular, a time-consuming clamping of the workpiece on a workpiece receiver may be avoided. A further or alternate aspect of the present invention is to provide a method for connecting at least two workpieces, in which undesired effects on the workpieces are largely avoided.

The present invention provides a device for laser welding of a workpiece that includes a laser treatment head, a receiver carrying the laser treatment head and displaceable along a linear treatment zone, and a support configured to be temporarily fixable to the workpiece.

BRIEF DESCRIPTION OF THE DRAWINGS

The invention permits various embodiments. For further clarification of the basic principle of the invention, various of these are described in the following and are shown in the drawings, in which, in each case in a schematic diagram:

FIG. 4 is a plan view of a further device according to the invention, comprising a gateway 16 and a guideway 18 for the displaceable laser treatment head 2;

FIG. 5 is a side view of the device shown in FIG. 4, comprising a scanning unit 21 configured as a distance roller 21;

DETAILED DESCRIPTION

Figure 1:
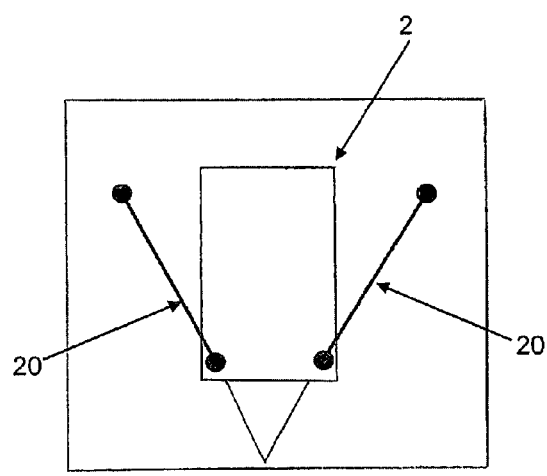
FIG. 1 shows a laser treatment head 2 which is arranged so as to be displaceable by means of a mount 20.
Figure 2:
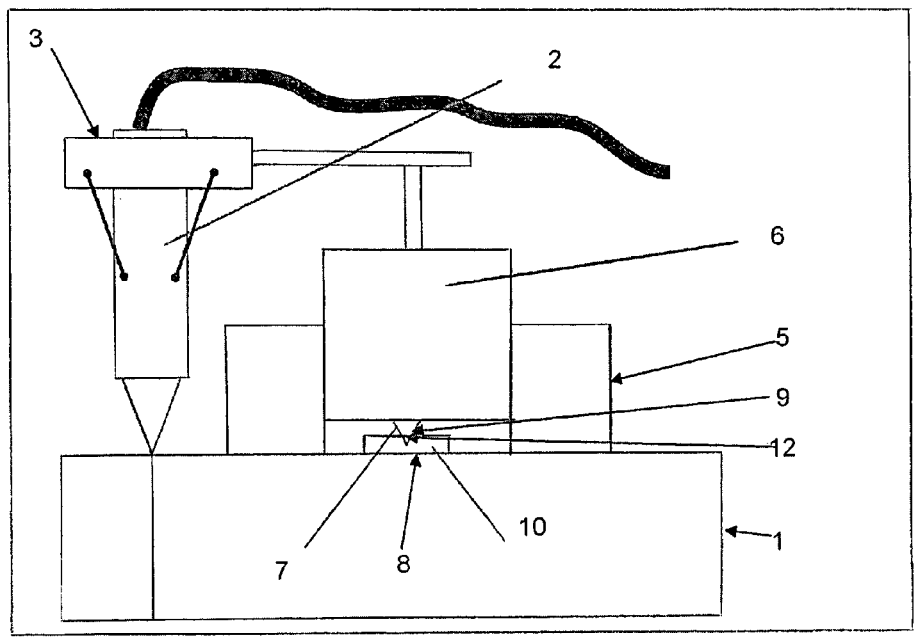
FIG. 2 shows a device according to the invention with a running gear 6 equipped with a plurality of rollers 5.
Figure 3:
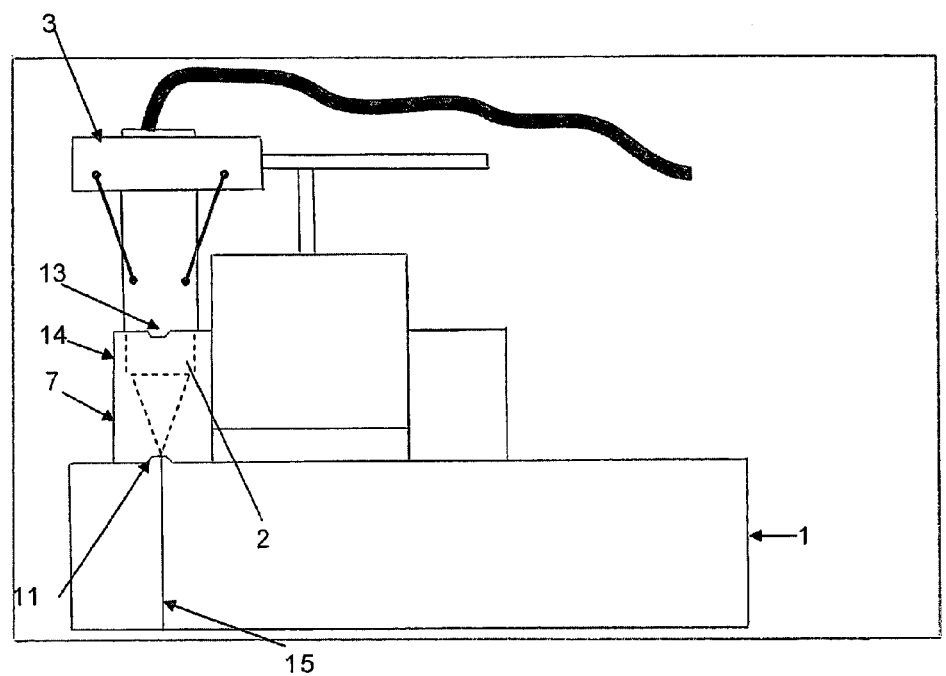
FIG. 3 shows a further device according to the invention, in which a roller 14 is provided with a circumferential groove 13.
Figure 6:
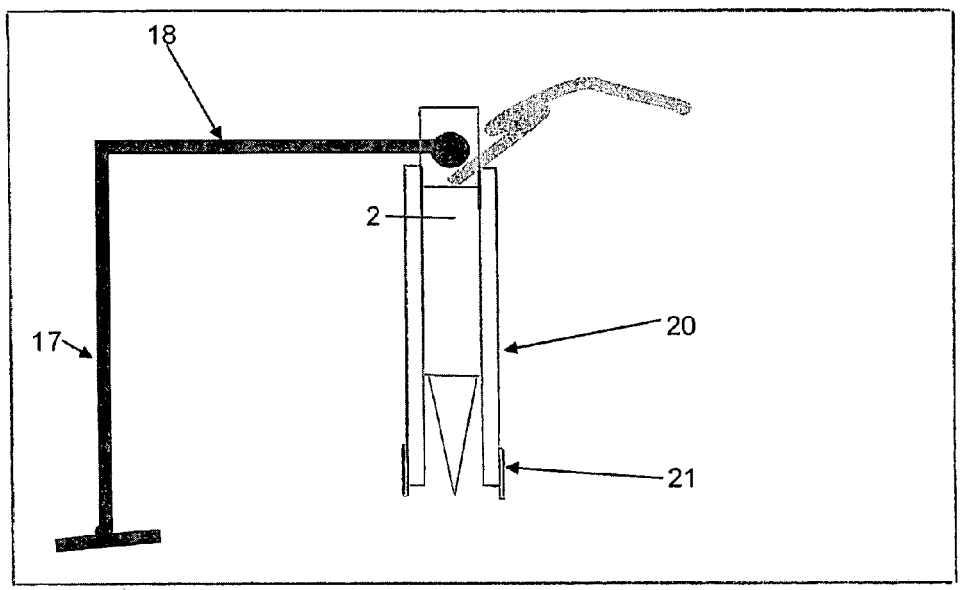
FIG. 6 is a front view of the device shown in FIG. 4.
Figure 7:
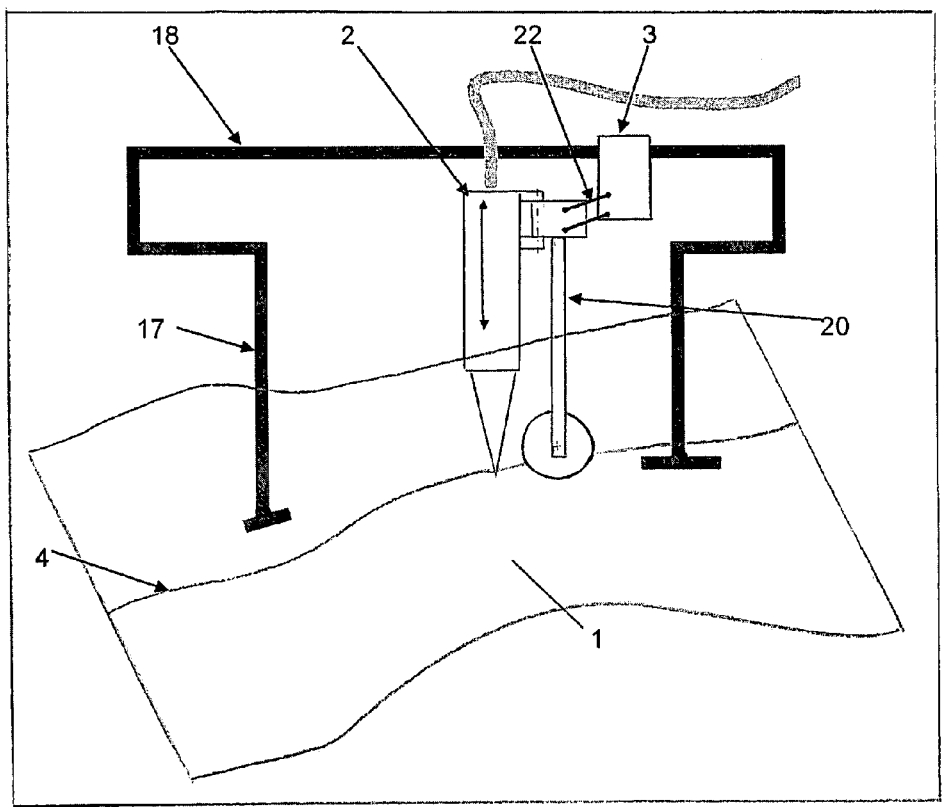
FIG. 7 shows the device shown in FIG. 4 in an arrangement which is fixed to a workpiece 1 by means of detachable contact surfaces.

The invention is described in greater detail in the following with reference to FIG. 1 to 7. A laser treatment device, configured as a mobile laser system, which makes it possible to work at constant treatment speeds independent of the position and at a constant working distance, is used for welding the workpieces 1. Various systems can be produced for this purpose. What all these systems have in common is that the guidance and fastening are primarily oriented on the workpiece 1. This applies in all cases to the distance of the focus point from the treatment zone.

The path of the seam can be retraced in various ways. For example, this may take place in contact with the workpiece 1 by means of tactile sensors, in particular by means of a guide element 8 configured as a guide rail 10 or a correspondingly configured relief 11 on the workpiece 1. Furthermore, the path of movement can be detected using the data of a previously measured contour.

The systems are also all provided with a sensor system which is capable of adjusting the angular position of the laser beam relative to the surface and producing an angle which is perpendicular to the course of the surface or parallel or perpendicular to gravity, or a desired constant angle. FIG. 1 shows a laser treatment head 2 of this type which is displaceable by means of a mount. In this case, the compensatory movement necessarily always takes place at the point of incidence of the laser.

Another device according to the invention has a running gear 6 provided with a plurality of rollers 5. This device is an automotive device carrier system. The running gear 6 is preferably provided with three or four rollers 5 and with a motor with a gear unit. The rollers 5 are configured so as to be steerable. The running gear 6 carries additional components, such as a gas inlet and an additional material inlet in particular.

The device may be guided by means of guide rails which are installed on the workpiece 1, or by means of a guide rail on the workpiece 1 parallel to the joining edge, or by suitable configuration of the joining edge or proximal region, for example by reliefs 11 on the workpiece 1 with one or more ramp surfaces or a guide notch in the plane of the seam.

The laser treatment head 2 is suspended in such a way that any tipping of the laser treatment head 2 takes place about the focus point on the workpiece 1. This mechanism is coupled to a sensor and a servomotor in such a way that any angle may constantly be maintained, even if the running gear 6 assumes different angles over the course of the surface.

Another device according to the invention, comprising a gateway 16 and a guideway 18 for the displaceable laser treatment head 2, is shown in FIG. 4 to 7. This device, which is configured as a mobile multi-axial system, is set up in the vicinity of the treatment zone to connect at least two separate workpieces 1 which are contiguous at a planar joining region 15. Before the mounting of a spacer disc, a travelling unit carrying the laser treatment head 2 is allowed to hang freely vertical under gravity and then fixed with a clamp in such a way that the angle relative to the surface cannot change. Afterwards, the spacer disc is mounted.

Subsequently, the start and end point or characteristic points such as turning points are approached and the respective positions thereof are stored, by remote control. This takes place with the aid of a camera, which is arranged on the treatment head and projects a target image with crosshairs onto a reproduction screen or an optical display.

The mobile multi-axial system consists of a linear axis providing the portal with at least two stands 17 equipped with support means 5 and a linear axis which serves as a guideway 18 and which provides the rate of feed in the seam direction. The laser treatment head 2 can be deflected in the direction of the main extension of the guideway 18 and also transverse to the main extension. This is permitted by a deflection axis, which allows curves in the path of the seam and is configured for example as an axis of rotation. The device further comprises a spring-loaded, force-loaded or mass-loaded height axis, which is oriented to the contour line of the seam by a distance roller 21, which is adjustable with respect to the reference position of a laser head.

Other supplementary axes are also possible. In this case, the guideway 18 is preferably configured as a linear axis and the further degrees of freedom are produced by axes of rotation. The gateway 16 is fastened to the workpiece 1 by clamping, magnets or suction devices on the support means 5. The guideway is configured in such a way that it is possible to treat the workpiece 1 over the whole of the extension thereof.

The treatment can take place on the basis of a treatment programme, in that start and end points are approached and stored and subsequently a linear path, or with a plurality of points a curved path, is determined by means of the control unit 23. Furthermore, the laser treatment head 2 can be manually displaced by remote control. In this case, with the moulds described, it is usually only necessary to travel linearly. Only two axes are controlled (longitudinal axis and displacement axis). The height axis follows the contour through the spring-loaded disc and thus remains at a constant distance.

It is also possible to let the deflection axis run free and to guide the disc or another guide element in a rail or guideway. Purely manual control via a remote control is also possible.

Additionally, the laser head may be arranged on a suspension means in such a way as to be rotatable, in the angular position thereof to the surface, about the contact point of the point of incidence of the laser on the surface. This angular position can be adjusted using a servomotor, in order to make displacement perpendicular to the surface possible as required.

The same effect can also be achieved by the use of two distance rollers 21 on the positioning means 20 on either side of the treatment zone. It is important in this case that the guide unit is mounted in such a way as to be rotatable on the longitudinal axis and a corresponding suspension means for the laser head is installed and allows the laser treatment head 2 to rotate about the laser contact point.

Both devices may be controlled by an external or internal coordinate measurement system, assisted by radio, radar, ultrasound, laser or satellite transmission.

The shape of the joining region is also of central importance. Depending on the laser welding process and a possible gap between the parts, sinking of the seam surface may occur. In order to achieve subsequent finishing of the surface without the expected sink marks, a small dimension of approximately 1 mm on the joining region is provided as a relief 11 on the workpiece 1. The width of the relief 11 must be only 3 mm to the left and right of the contact surface. In this way, even in the case of relatively large gaps, a smooth surface can be produced after the finishing, which generally takes place by grinding. The sides of the relief 11 in the joining region may be produced, so as to be accurate to size, on a CNC-system in a clamp.

Deep laser beam welding offers the possibility, when joining a plurality of workpieces 1, of welding very deep at a low width. Because the energy per unit length used is proportional to the melted cross-sectional area, a significantly lower energy per unit length is applied to the workpiece 1 in this laser process. This means that the distortions are drastically reduced in comparison with the electric arc method.

The joining process is therefore composed of two steps. In the first step, the substructure is joined by mechanical methods and laser welding. In the second step, the mould surface is welded by deep laser beam welding.

Further advantages of the method are:
high process speed (at least 1 m/min)
minimal distortion
apart from the joining region itself, surfaces can be finished
the method can be mechanized

LIST OF REFERENCE NUMERALS

1 Workpiece
2 Laser Treatment Head
3 Receiver
4 Linear Treatment Zone
5 Support Means (e.g., Plurality of Rollers)
6 Running Gear
7 Lead Element
8 Guide Element
9 Recess
10 Guide Rail
11 Linear Relief
12 Probe
13 Circumferential Neck/Groove
14 Roller
15 Planar Joining Region
16 Gateway
17 Stands
18 Guideway
19 Mounting
20 Positioning Means (e.g., Mount)
21 Scanning Unit (e.g., Distance Roller)
22 Parallelogram Guide
23 Control Unit

What is claimed is:

1. A method for connecting a first workpiece having a first planar joining surface to a second workpiece having a second planar joining surface, the method comprising:
provinding a laser welding device that includes a laser treatment head, a receiver carrying the laser treatment head, and a support structure having a linear guideway supported by a first stand element and a second stand element, the receiver being disposed on the linear guideway so as to be displaceable along the linear guideway;
placing the first and second workpieces adjacent one another so that the first planar joining surface faces the second planar surface so as to create a treatment seam relative to a mutual upper surface of the first and second workpieces;
affixing the first stand element to one of the first and second workpieces;
affixing the second stand element to one of the first and second workpieces;
positioning the laser head so as to focus a laser beam at a first point on the treatment seam;
displacing the receiver along the linear guideway so as to move the laser beam along the treatment seam to a second point on the treatment seam and to thereby weld the first and second workpieces to each other along the treatment seam; and
detaching the first and second stand elements from the joined workpieces.

2. The method as recited in claim 1, wherein the first and second workpieces are metallic pieces of a mold for molding a large plastics material structural part.

3. The method as recited in claim 1, wherein the mutual upper surface has a non-planar contour.

4. The method as recited in claim 1, wherein the affixing of the first and second stand elements includes affixing the first and second stand elements to the mutual upper surface.

5. The method as recited in claim 1, wherein laser welding device includes a positioning device rigidly disposed relative to the laser head, the positioning device configured to keep the laser head a constant distance from the treatment seam as the receiver is displaced along the linear guideway.

6. The method as recited, in claim 5, wherein the positioning device includes a distance roller in contact with the upper surface.

7. The method as recited in claim 1, wherein the displacing of the receiver along the guideway is performed using an electric motor.

8. The method as recited in claim 1, wherein the displacing of the receiver is controlled by a control unit.

9. The method as recited in claim 8, further comprising, prior to performing the positioning step, moving the laser head to a first reference point on the treatment seam and to a second reference point on the treatment seam so as to determined the coordinates of the first and second reference points and supplying the coordinates to the controller.

10. The method as recited in claim 1, wherein the laser head is moveable relative to the receiver, so as to enable the laser beam to be directed along the treatment seam during the displacing of the receiver along the guideway.

11. A method for connecting a first workpiece having a first planar joining surface to a second workpiece having a second planar joining surface, the method comprising:
providing a laser welding device that includes a laser treatment head and a moveable receiver carrying the laser treatment head;
placing the first and second workpieces adjacent one another so that the first planar joining surface faces the second planar joining surface so as to create a treatment seam relative to a mutual upper surface of the first and second workpieces;
positioning the laser head so as to focus a laser beam at the treatment seam; and
displacing the receiver along an elongated guide element so as to move the laser beam along the treatment seam and thereby weld the first and second workpieces to each other along the treatment seam.

12. The method as recited in claim 11, further comprising attaching the elongated guide element to the mutual upper surface of one of the first and second workpieces before the displacing step.

13. The method as recited in claim 12, further comprising removing the elongated guide element from the mutual upper surface after the displacing step.

14. The method as recited in claim 11, wherein the first and second workpieces are metallic pieces of a mold for molding a large plastics material structural part.

15. The method as recited in claim 11, wherein the mutual upper surface has a non-planar contour.

16. The method as recited in claim 11, wherein laser welding device includes a positioning device rigidly disposed relative to the laser head, the positioning device configured to keep the laser head a constant distance from the treatment seam as the receiver is displaced along guide element.

17. The method as recited in claim 16, wherein the positioning device includes a distance roller in contact with the upper surface.

18. The method as recited in claim 11, wherein the displacing of the receiver along the guide element is performed using an electric motor.

19. The method as recited in claim 11, wherein the displacing of the receiver is controlled by a control unit.

20. The method as recited in claim 19, further comprising prior to performing the positioning step, moving the laser head to a first reference point on the treatment seam and to a second reference point on the treatment seam so as to determined the coordinates of the first and second reference points and supplying the coordinates to the controller.

21. The method as recited in claim 11, wherein the laser head is moveable relative to the receiver, so as to enable the laser beam to be directed along the laser seam during the displacing of the receiver along the guide element.

* * * * *